United States Patent
Kempf et al.

(10) Patent No.: US 9,473,921 B2
(45) Date of Patent: Oct. 18, 2016

(54) SYSTEM, DEVICE AND METHODS FOR BILLING A USER FOR THEIR CONSUMPTION OF MOBILE BROADBAND SERVICES AND VIRTUALIZED CLOUD RESOURCES

(71) Applicant: TELEFONAKTIEBOLAGET L M ERICSSON (PUBL), Stockholm (SE)

(72) Inventors: James Kempf, Mountain View, CA (US); Mikael Persson, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 234 days.

(21) Appl. No.: 14/270,919

(22) Filed: May 6, 2014

(65) Prior Publication Data

US 2015/0327042 A1    Nov. 12, 2015

(51) Int. Cl.
| | |
|---|---|
| H04W 4/00 | (2009.01) |
| H04W 4/24 | (2009.01) |
| G06F 9/50 | (2006.01) |
| H04L 12/24 | (2006.01) |
| H04L 29/08 | (2006.01) |
| H04M 15/00 | (2006.01) |
| H04L 12/14 | (2006.01) |

(52) U.S. Cl.
CPC .............. *H04W 4/24* (2013.01); *G06F 9/5072* (2013.01); *G06F 9/5077* (2013.01); *H04L 12/1403* (2013.01); *H04L 12/1432* (2013.01); *H04L 41/5096* (2013.01); *H04L 67/10* (2013.01); *H04M 15/64* (2013.01); *H04M 15/888* (2013.01); *H04W 4/003* (2013.01); *H04L 12/1457* (2013.01); *H04L 12/1467* (2013.01)

(58) Field of Classification Search
None
See application file for complete search history.

(56) References Cited

U.S. PATENT DOCUMENTS

| | | | |
|---|---|---|---|
| 2014/0018035 A1* | 1/2014 | Albisu | H04L 12/1403 455/406 |
| 2014/0032531 A1* | 1/2014 | Ravi | G06F 17/30554 707/722 |

OTHER PUBLICATIONS

Calhoun, et al.: "Diameter Base Protocol". Network Working Group, Request for Comments: 3588. Sep. 2003.
"Introducing JSON" ECMA-404 The JSON Data Interchange Standard. www.json.org.
OpenStack, Admin User Guide (May 1, 2014). pp. 1-90.
OpenStack, End User Guide (May 1, 2014). pp. 1-127.

* cited by examiner

*Primary Examiner* — Charles Appiah
*Assistant Examiner* — Margaret G Mastrodonato

(57) ABSTRACT

A system, a device, and various methods are described herein for billing a user for their consumption of mobile broadband services which are monitored by a mobile broadband charging system and for their consumption of virtualized cloud resources which are monitored by a cloud operating system. In one example, the system comprises a commercially available mobile broadband charging system and a commercially available cloud operating system and then incorporates the device to combine the commercially available mobile broadband charging system and the commercially available cloud operating system in order to bill the user for their consumption of mobile broadband services and virtualized cloud resources.

22 Claims, 5 Drawing Sheets

SYSTEM, DEVICE AND METHODS FOR BILLING A USER FOR THEIR CONSUMPTION OF MOBILE BROADBAND SERVICES AND VIRTUALIZED CLOUD RESOURCES

TECHNICAL FIELD

The present invention relates to a system, a device, and various methods for billing a user for their consumption of mobile broadband services which are monitored by a mobile broadband charging system and for their consumption of virtualized cloud resources which are monitored by a cloud operating system.

BACKGROUND

The following abbreviations are herewith defined, at least some of which are referred to within the following description of the prior art and the present invention.
API Application Programming Interface
B2B Back-to-Back
CC Charge Control
CIPIP Common Industrial Protocol over IP
CPU Central Processing Unit
DCCAM Data Center Charging Application Module
GUI Graphical User Interface
HR Human Resources
HTML HyperText Markup Language
HTTP Hypertext Transfer Protocol
IP Internet Protocol
JSON JavaScript Object Notation
MOCS Mobile Operator Charging System
OS OpenStack
IaaS Infrastructure as a Service
PaaS Platform as a Service
REST Representational State Transfer
RFC Request for Comments
SaaS Software as a Service
SMS Short Message Service
SSU Service Specific Units
URL Uniform Resource Locator
VOIP Voice over Internet Protocol
VRUM Virtualized Resource Usage Metering A mobile operator typically runs a mobile broadband charging system that allows them to bill a user for their consumption of different kinds of mobile broadband services in various ways. For example, a mobile operator can offer zero rating, where all the charges for a particular user go onto the bill of an enterprise account. Plus, a mobile operator can provide special offers, where a user for example receives a special offer for a certain number of megabytes of data free, after which they must pay. However, if the mobile operator wanted to bill a user for their consumption of both mobile broadband services and virtualized cloud resources (computing, storage, network, as well as application usage) then the mobile operator would have to custom build a cloud operating system and connect their custom-built cloud operating system to their mobile broadband charging system. Although this particular process to bill the user would work it is still desirable to improve how a mobile operator can bill the user for their consumption of mobile broadband services and virtualized cloud resources.

SUMMARY

A system, a device and various methods which improve how a mobile operator can bill a user for their consumption of mobile broadband services and virtualized cloud resources are described in the independent claims of the present application. Advantageous embodiments of the system, the device, and the various method have been described in the dependent claims of the present application.

In one aspect, the present invention comprises a system configured for billing a user for their consumption of mobile broadband services and virtualized cloud resources. In one embodiment, the system comprises a graphical user interface, a mobile broadband charging system, a cloud operating system, and a device. The mobile broadband charging system is configured to (1) monitor mobile broadband usage of the user, (2) rate the monitored mobile broadband usage of the user, and (3) store charges of the rated mobile broadband usage of the user. The cloud operating system is configured to (1) monitor virtual resource usage of the user, (2) meter data associated with the monitored virtual resource usage of the user, and (3) store the metered data associated with the monitored virtual resource usage of the user. The device comprises a processor and a memory that stores processor-executable instructions where the processor interfaces with the memory and executes the processor-executable instructions to enable a usage reporting interface, a data center charging adaptation module, and a query interface. The data center charging adaptation module is enabled to (1) periodically query the cloud operating system for the stored metered data associated with the monitored virtual resource usage of the user, (2) receive the metered data, (3) convert the metered data into a format supported by the mobile broadband charging system, and (4) call the usage reporting interface to forward the converted metered data to the mobile broadband charging system, wherein the mobile broadband charging system rates the converted metered data and stores charges of the rated converted metered data of the monitored virtual resource usage of the user. The query interface is enabled to (1) receive a billing request associated with the user, (2) obtain billing information associated with the stored charges of the rated mobile broadband usage of the user and the stored charges associated with the rated converted data of the virtual resource usage of the user from the mobile broadband charging system, and (3) output the obtained billing information associated with the user. The system has an advantage in that it allows a mobile operator to do consolidated charging of mobile wireless service and cloud virtualized resource usage.

In another aspect, the present invention comprises a method in a system for billing a user for their consumption of mobile broadband services and virtualized cloud resources, wherein the system comprises a graphical user interface, a mobile broadband charging system, a cloud operating system, and a device. In one embodiment, the method comprises operating the mobile broadband charging system to (1) monitor mobile broadband usage of the user, (2) rate the monitored mobile broadband usage of the user, and (3) store charges of the rated mobile broadband usage of the user. Further, the method comprises operating the cloud operating system to (1) monitor virtual resource usage of the user, (2) meter data associated with the monitored virtual resource usage of the user and (3) store the metered data associated with the monitored virtual resource usage of the user. In addition, the method comprises operating the device which comprises a usage reporting interface, a data center charging adaptation module, and a query interface. In particular, the data center charging adaptation module is operated to (1) periodically query the cloud operating system for the stored metered data associated with the monitored virtual resource usage of the user, (2) receive the metered data, (3)

convert the metered data into a format supported by the mobile broadband charging system, and (4) call the usage reporting interface to forward the converted metered data to the mobile broadband charging system, wherein the mobile broadband charging system further operates to rate the converted metered data and store charges of the rated converted metered data of the monitored virtual resource usage of the user. The query interface is operated to (1) receive a billing request associated with the user (2) obtain billing information associated with the stored charges of the rated mobile broadband usage of the user and the stored charges associated with the rated converted data of the virtual resource usage of the user from the mobile broadband charging system, and (3) output the obtained billing information associated with the user. The method has an advantage in that it allows a mobile operator to do consolidated charging of mobile wireless service and cloud virtualized resource usage.

In still another aspect, the present invention comprises a device configured for billing a user for their consumption of mobile broadband services which are monitored by a mobile broadband charging system and for their consumption of virtualized cloud resources which are monitored by a cloud operating system. In one embodiment, the device comprises a processor and a memory that stores processor-executable instructions where the processor interfaces with the memory and executes the processor-executable instructions to enable a usage reporting interface, a data center charging adaptation module, and a query interface. The data center charging adaptation module is enabled to: (1) periodically query the cloud operating system for stored metering data associated with a monitored virtual resource usage of the user; (2) receive the metering data; (3) convert the metering data into a format supported by the mobile broadband charging system; and (4) call the usage reporting interface to forward the converted metering data to the mobile broadband charging system. The query interface is enabled to: (1) receive a billing request associated with the user; (2) obtain billing information associated with stored charges of a mobile broadband usage of the user and stored charges of the virtual resource usage of the user from the mobile broadband charging system; and (3) output the obtained billing information associated with the user. The device has an advantage in that it allows a mobile operator to do consolidated charging of mobile wireless service and cloud virtualized resource usage.

In yet another aspect, the present invention comprises a method in a device for billing a user for their consumption of mobile broadband services which are monitored by a mobile broadband charging system and for their consumption of virtualized cloud resources which are monitored by a cloud operating system, and wherein the device comprises a usage reporting interface, a data center charging adaptation module, and a query interface. In one embodiment, the method comprises operating the data center charging adaptation module to (I) periodically query the cloud operating system for stored metering data associated with a monitored virtual resource usage of the user, (2) receive the metering data, (3) convert the metering data into a format supported by the mobile broadband charging system, and (4) call the usage reporting interface to forward the converted metering data to the mobile broadband charging system. Further, the method comprises operating the query interface to (1) receive a billing request associated with the user, (2) obtain billing information associated with stored charges of a mobile broadband usage of the user and stored charges of the virtual resource usage of the user from the mobile broadband charging system, and (3) output the obtained billing information associated with the user. The method has an advantage in that it allows a mobile operator to do consolidated charging of mobile wireless service and cloud virtualized resource usage.

Additional aspects of the invention will be set forth, in part, in the detailed description, figures and any claims which follow, and in part will be derived from the detailed description, or can be learned by practice of the invention. It is to be understood that both the foregoing general description, and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
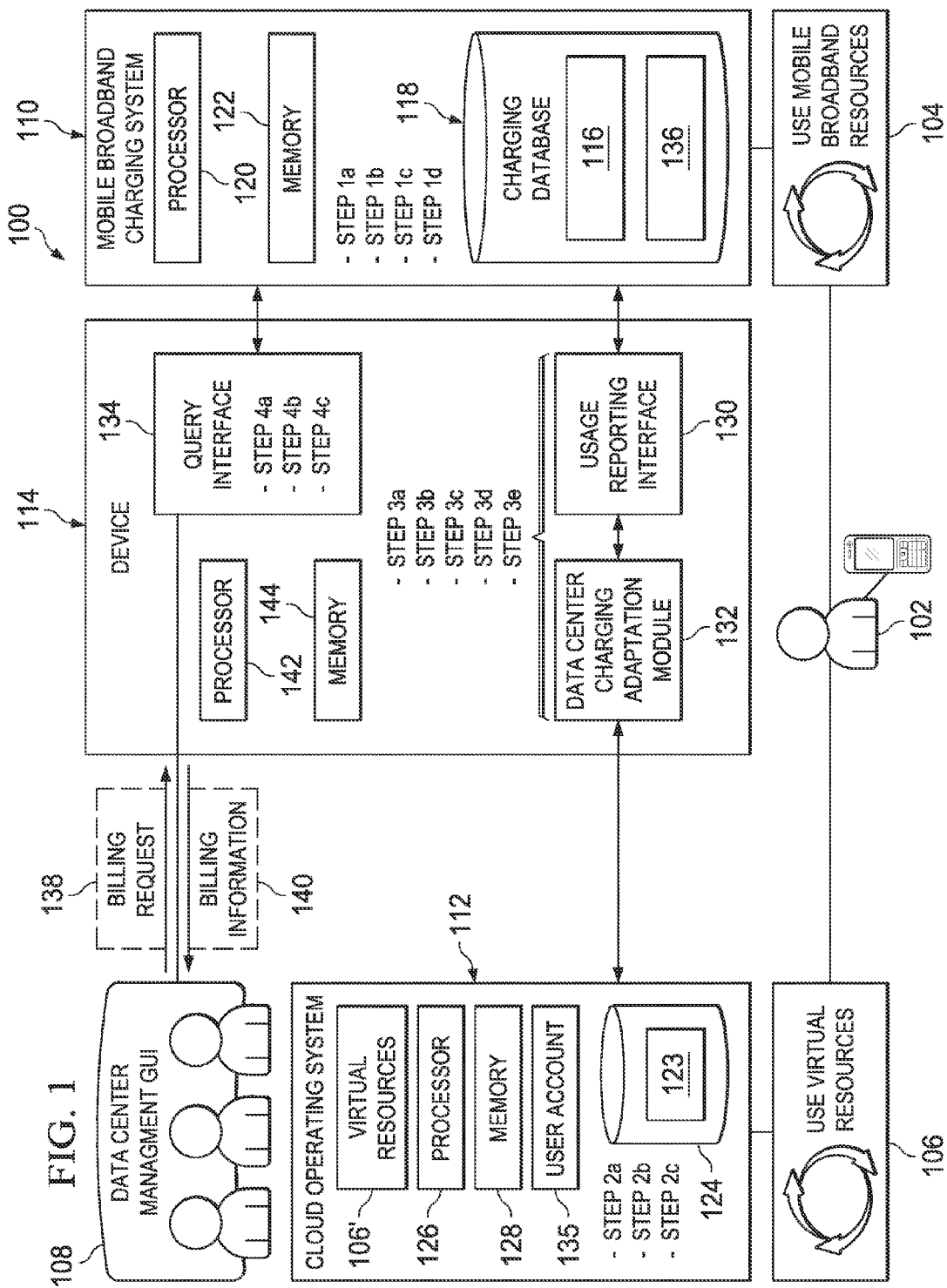
FIG. 1 is a diagram of a system configured for billing a user for their consumption of mobile broadband services and virtualized cloud resources in accordance with an embodiment of the present invention

Referring to FIG. 1, there is shown a diagram of a system 100 configured for billing a user 102 for their consumption of mobile broadband services 104 and virtualized cloud resources 106 in accordance with an embodiment of the present invention. As shown, the system 100 comprises a graphical user interface 108 (GUI 108), a mobile broadband charging system 110, a cloud operating system 112, and a specially configured device 114. The specially configured device 114 effectively connects the mobile broadband charging system 110 and the cloud operating system 112 to enable the billing of the user 102 for their consumption of mobile broadband services 104 and virtualized cloud resources 106. It should be appreciated that the description provided herein about the GUI 108, the mobile broadband charging system 110, the cloud operating system 112, and the specially configured device 114 describes only the operations (steps) performed by those components which are needed to explain and enable the present invention. It should also be appreciated that the GUI 108, the mobile broadband charging system 110, the cloud operating system 112, and the specially configured device 114 could also perform many other operations (steps) but for clarity those other operations (steps) have not been described herein.

The mobile broadband charging system 110 is configured to perform at least the following operations: (1) monitor the mobile broadband usage 104 of the user 102 (step 1a) (note: the mobile broadband services themselves are provided by the mobile operator); (2) rate the monitored mobile broadband usage 104 of the user 102 (step 1b) (note: the monitored mobile broadband usage 104 of the user 102 can be rated in various ways such as zero rating or applying special offers); and (3) store charges 116 of the rated mobile broadband usage 104 of the user 102 in a charging database 118 (step 1c). The mobile broadband charging system 110 can be a commercially available system or a new system which is configured to be an integral part of the system 100. In any case, the mobile broadband charging system 110 could have a processor 120 and a memory 122 that stores processor-executable instructions where the processor 120 interfaces with the memory 122 and executes the processor-executable instructions to enable at least steps 1a, 1b and 1c. Further, the mobile broadband charging system 110 can be configured to use the diameter protocol during the implementation of steps 1a, 1b and 1c. The diameter protocol is described in RFC 3588 "Diameter Base Protocol" September 2003 where the contents of this document are hereby incorporated by reference herein.

The cloud operating system 112 is configured to perform at least the following operations: (1) monitor the virtual resource usage 106 of the user 102 (step 2a)(note: the virtual resources 106' themselves are part of the cloud operating system 112); (2) meter data associated with the monitored virtual resource usage 106 of the user 102 (step 2b); and (3) store the metered data 123 associated with the monitored virtual resource usage 106 of the user 102 in one or more storage device(s) 124 (step 2c). The cloud operating system 112 can be a commercially available system or a new system which is configured to be an integral part of the system 100. In any case, the cloud operating system 112 could have a processor 126 and a memory 128 that stores processor-executable instructions where the processor 126 interfaces with the memory 128 and executes the processor-executable instructions to enable at least steps 2a, 2b and 2c. Further, the cloud operating system 112 could be configured to use HTTP REST APIs in the implementation of steps 2a, 2b and 2c.

The specially configured device 114 comprises at least a usage reporting interface 130 (e.g., usage reporting interface REST API 130), a data center charging adaptation module 132 and a query interface 134 (e.g., query interface REST API 134). The data center charging adaptation module 132 is configured to perform at least the following operations: (1) periodically query the cloud operating system 112 for the stored metered data 123 associated with the monitored virtual resource usage 106 of the user 102 (step 3a); (2) receive the metered data 123 (step 3b); (3) convert the metered data 123 into a format supported by the mobile broadband charging system 110 (step 3c), and (4) call the usage reporting interface 130 to forward the converted metered data 123 to the mobile broadband charging system 110 (step 3d) (note: the mobile broadband charging system 110 is further configured to rate (in various ways) the converted metered data 123 and store charges 136 of the rated converted metered data in the charging database 118 (see step 1d)); and (5) monitor an account 135 of the user 102, disable access by the user 102 to the virtualized cloud resources 106' and passivize any active virtual resource instance if the account 135 is out of funds, and then re-enable access by the user 102 to the virtualized cloud resources 106' and reactive any passivised virtual resource instances if the account 135 is replenished with funds (step 3e—optional). The mobile broadband charging system 110 can have a similar account and functionality where the user 102 has access to mobile broadband resources only when the account is funded. Alternatively the mobile broadband charging system 110 and the cloud operating system 112 can have one single account for the user 102 which is utilized for both the mobile broadband services 104 and the virtual resources 106.

Further, the query interface 134 is configured to perform at least the following operations: (1) receive a billing request 138 associated with the user 102 from the GUI 108 (step 4a); (2) obtain billing information 140 associated with the stored charges 116 of the rated mobile broadband usage 104 of the user 102 and the stored charges 136 associated with the rated converted metered data 123 of the virtual resource usage 106 of the user 102 from the mobile broadband charging system 110 (step 4b); and (3) output the obtained billing information 140 associated with the user 102 to the GUI 108 (step c). The specially configured device 114 could have a processor 142 and a memory 144 that stores processor-executable instructions where the processor 142 interfaces with the memory 144 and executes the processor-executable instructions to enable at least steps 3a, 3b, 3c, 3d, 3e (optional), 4a, 4b and 4c.

Figure 5:
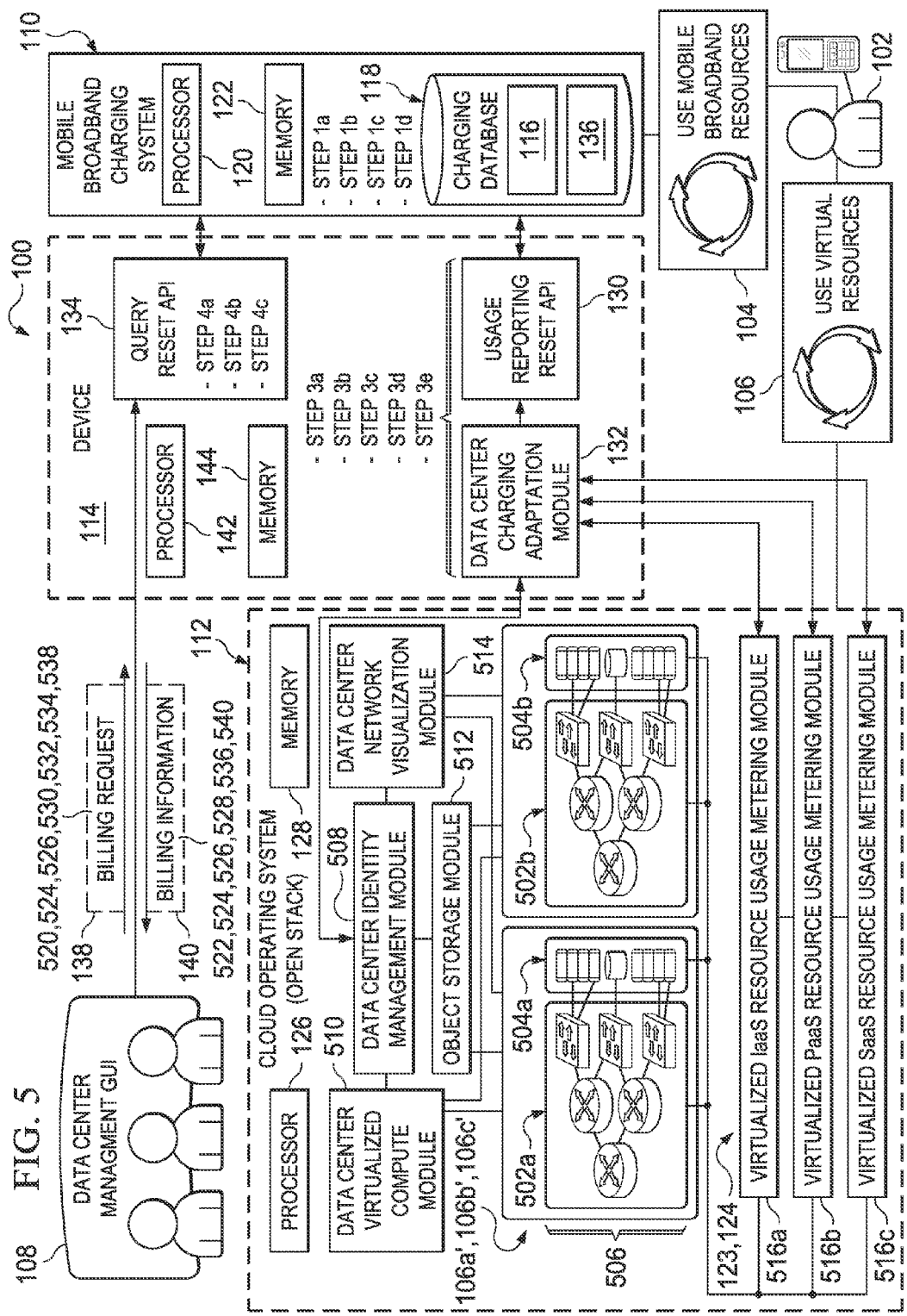
FIG. 5 is a block diagram of an exemplary system comprising a commercially available mobile charging system, a commercially available cloud operating system and a new specially configured device which is used to connect the commercially available mobile charging system to the commercially available cloud operating system in order to bill the user for their consumption of mobile broadband services and virtualized cloud resources in accordance with an embodiment of the present invention.

As discussed above, the system 100 may comprise a commercially available mobile broadband charging system 110 and a commercially available cloud operating system 112 and then incorporate the specially configured device 112 to combine the commercially available mobile broadband charging system 110 and the commercially available cloud operating system 112 in order to bill the user 102 (only one shown) for their consumption of mobile broadband services 104 and virtualized cloud resources 106 (e.g., see FIG. 5). Alternatively, the system 110 may comprise a commercially available mobile charging system 110 which has been reprogrammed to implement both the cloud operating system 112 (or at least the metering portion thereof) and the specially configured device 114 in order to bill the user 102 for their consumption of mobile broadband services 104 and virtualized cloud resources 106. In yet another alternative, the system 110 may comprise a commercially available cloud operating system 110 (or at least the metering portion thereof) which has been reprogrammed to implement both the mobile charging system 108 and the specially configured device 114 in order to bill the user 102 for their consumption of mobile broadband services 104 and virtualized cloud resources 106. In any of these cases, the system 100 may have just one processor 142 (for example) and one memory 144 (for example) to enable steps 1a, 1b, 1c, 1d, 2a, 2b, 3a, 3b, 3c, 3d, 3e (optional), 4a, 4b and 4c.

Figure 2:
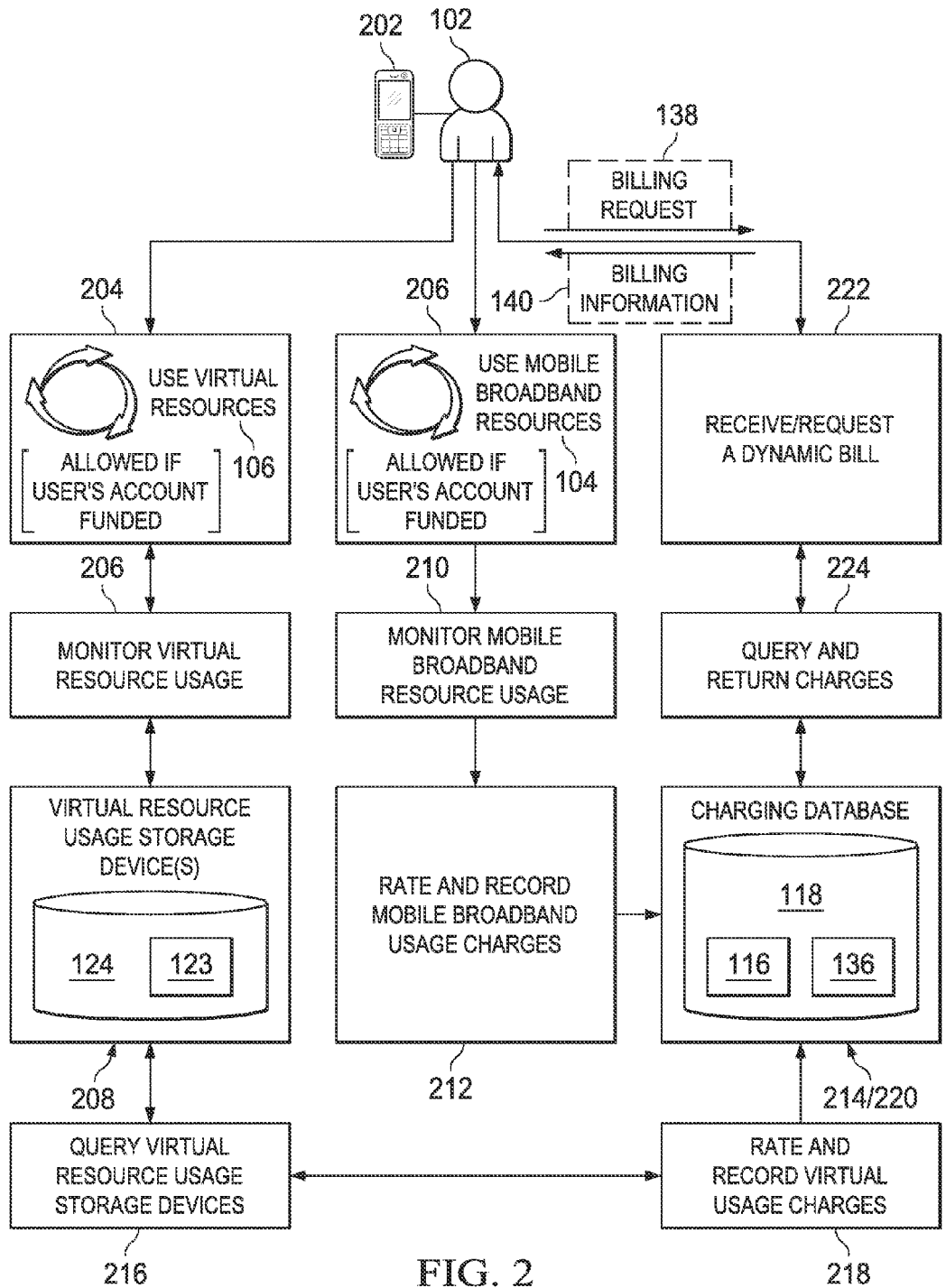
FIG. 2 is a flow diagram that illustrates the main operations of the system in accordance with the present invention.

Referring to FIG. 2, there is shown a flow diagram that illustrates the main operations of the system 100 in accordance with the present invention. As shown, the user 102 interacts with their device 202 (e.g., mobile phone 202, smart phone 202, personal digital assistant 202, tablet 202, laptop computer 202) to consume virtual resources 106 (box 204) and mobile broadband resources 104 (box 206). Typically, the user 102 would be able to consume the virtual resources 104 and mobile broadband resources 106 only if their account(s) 135 was properly funded. The cloud operating system 112 would monitor and meter the virtual resource usage 106 of the user 102 (box 206) and store this data 123 in the virtual resource storage device(s) 124 (box 208). The mobile charging system 110 would monitor the mobile broadband resource usage 104 of the user 102 (box 210) and then rate and record the monitored mobile broadband usage charges 116 for the user 102 in the charging database 118 (boxes 212 and 214). The specially configured device 114 would periodically query the virtual resource storage device(s) 12.4 or some other cloud metering component(s) associated with the virtual resource storage device(s) 124 to obtain the consumed metered virtual resources data 123 for the user 102 (box 216). The specially configured device 114 would provide the obtained data 123 to the mobile charging system 110 which then rates the data 123 and records the virtual resources charges 136 of the user 102 in the charging database 118 (boxes 218 and 220). Then, the user 102 (shown) or the mobile operator (see FIG. 1's GUI 108) could send a billing request 138 which is received by the specially configured device 114 (box 222). The specially configured device 114 then queries the charging database 118 and sends billing information 140 (associated with retrieved charges 116 and 136) back to the user 102 (shown) or the mobile operator (see FIG. 1's GUI 108) (box 224). In one example, the user 102 could request that the specially configured device 114 provide them real-time billing information 140 for their consumption of virtual resources 106 and mobile broadband resources 104. Or, the mobile operator use the specifically configured device 114 to prepare a monthly bill 140 (for example) to send to the user 102 for their consumption of virtual resources 106 and mobile broadband resources 104.

Figure 3:
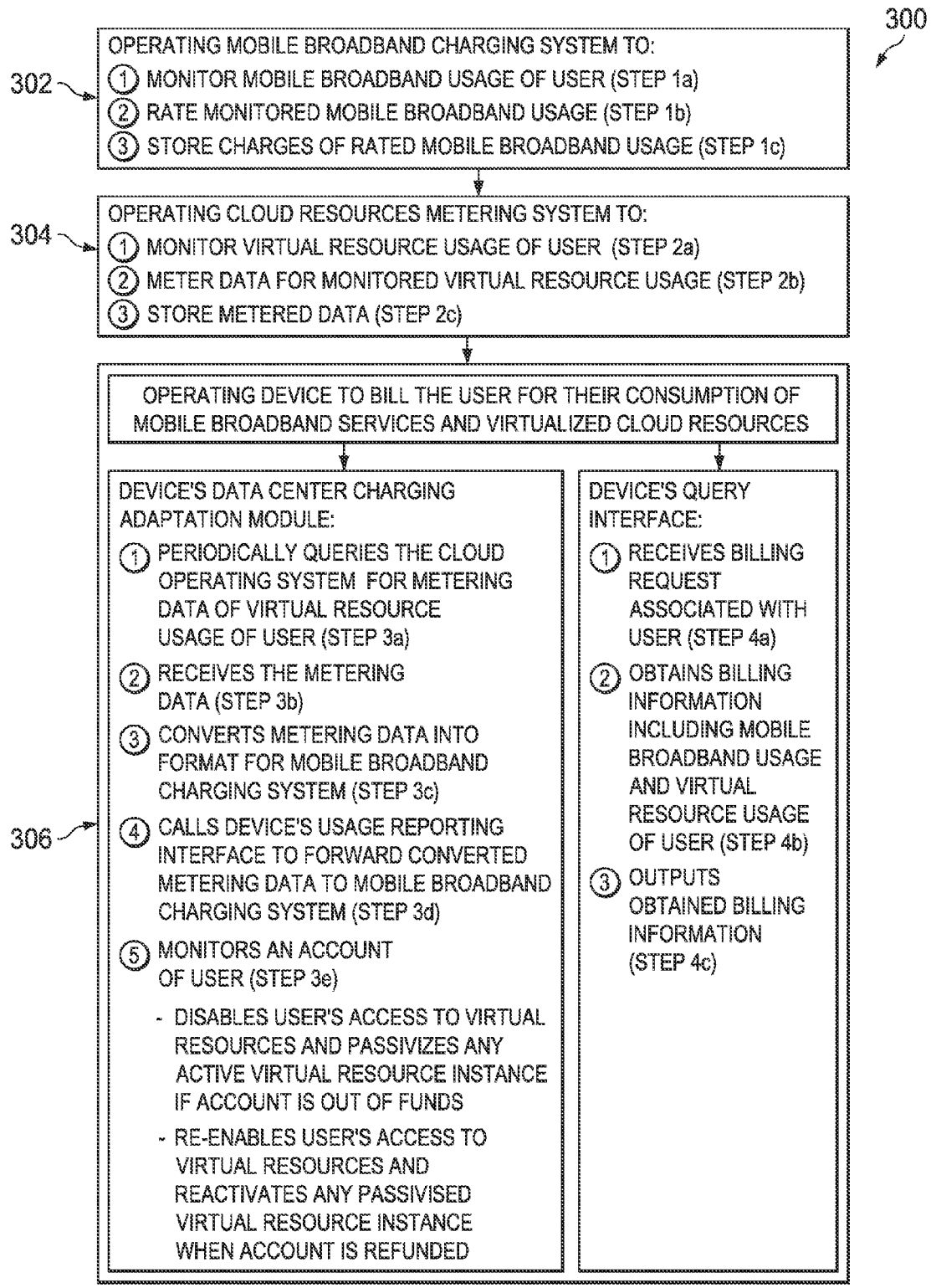
FIG. 3 is a flow chart of a method implemented in the system for billing the user for their consumption of mobile broadband services and virtualized cloud resources in accordance with an embodiment of the present invention.

Referring to FIG. 3, there is shown a flow chart of a method 300 implemented in the system 100 for billing the user 102 for their consumption of mobile broadband services 104 and virtualized cloud resources 106 in accordance with an embodiment of the present invention. At step 302, the mobile broadband charging system 110 is operated to: (1) monitor the mobile broadband usage 104 of the user 102 (step 1a); (2) rate the monitored mobile broadband usage 104 of the user 102 (step 1b); and (3) store charges 116 of the rated mobile broadband usage 104 of the user 102 in the charging database 118 (step 1c). At step 304, the cloud operating system 112 is operated to: (1) monitor virtual resource usage 106 of the user 102 (step 2a), (2) meter data associated with the monitored virtual resource usage 106 of the user 102 (step 2b), and (3) store the metered data 123 associated with the monitored virtual resource usage 106 of the user 102 in the storage device(s) 124 (e.g., metering devices 124)(step 2c). At step 306, the specially configured device 114 is operated to bill the user 102 for their consumption of mobile broadband services 104 and virtualized cloud resources 106. To accomplish step 306, the specially configured device's data center charging adaptation module 132 is operated to: (1) periodically query the cloud operating system 112 for the stored metered data 123 associated with the monitored virtual resource usage 106 of the user 102 (step 3a), (2) receive the metered data 123 (step 3b), (3) convert the metered data 123 into a format supported by the mobile broadband charging system 110 (step 3c), (4) call the usage reporting interface 130 to forward the converted metered data 123 to the mobile broadband charging system 110 (step 3d)(note: the mobile broadband charging system 110 is configured to rate (in various ways) the converted metered data 123 and store charges 136 of the rated converted metered data in the charging database 118); and (5) monitor the account 135 of the user 102, disable access by the user 102 to the virtualized cloud resources 106' and passivize any active virtual resource instance if the account 135 is out of funds, and then re-enable access by the user 102 to the virtualized cloud resources 106' and reactive any passivised virtual resource instances if the account 135 is replenished with funds (this monitor operation is optional) (step 3e). Further, the specially configured device's query interface 134 is operated to: (I) receive the billing request 138 associated with the user 102 from the GUI 108 or the user 102 directly (step 4a); (2) obtain billing information 140 associated with the stored charges 116 of the rated mobile broadband usage 104 of the user 102 and the stored charges 136 associated with the rated converted metered data 123 of the virtual resource usage 106 of the user 102 from the mobile broadband charging system 110 (step 4b); and (3) output the obtained billing information 140 associated with the user 102 to the GUI 108 or the user 102 (step 4c).

Figure 4:
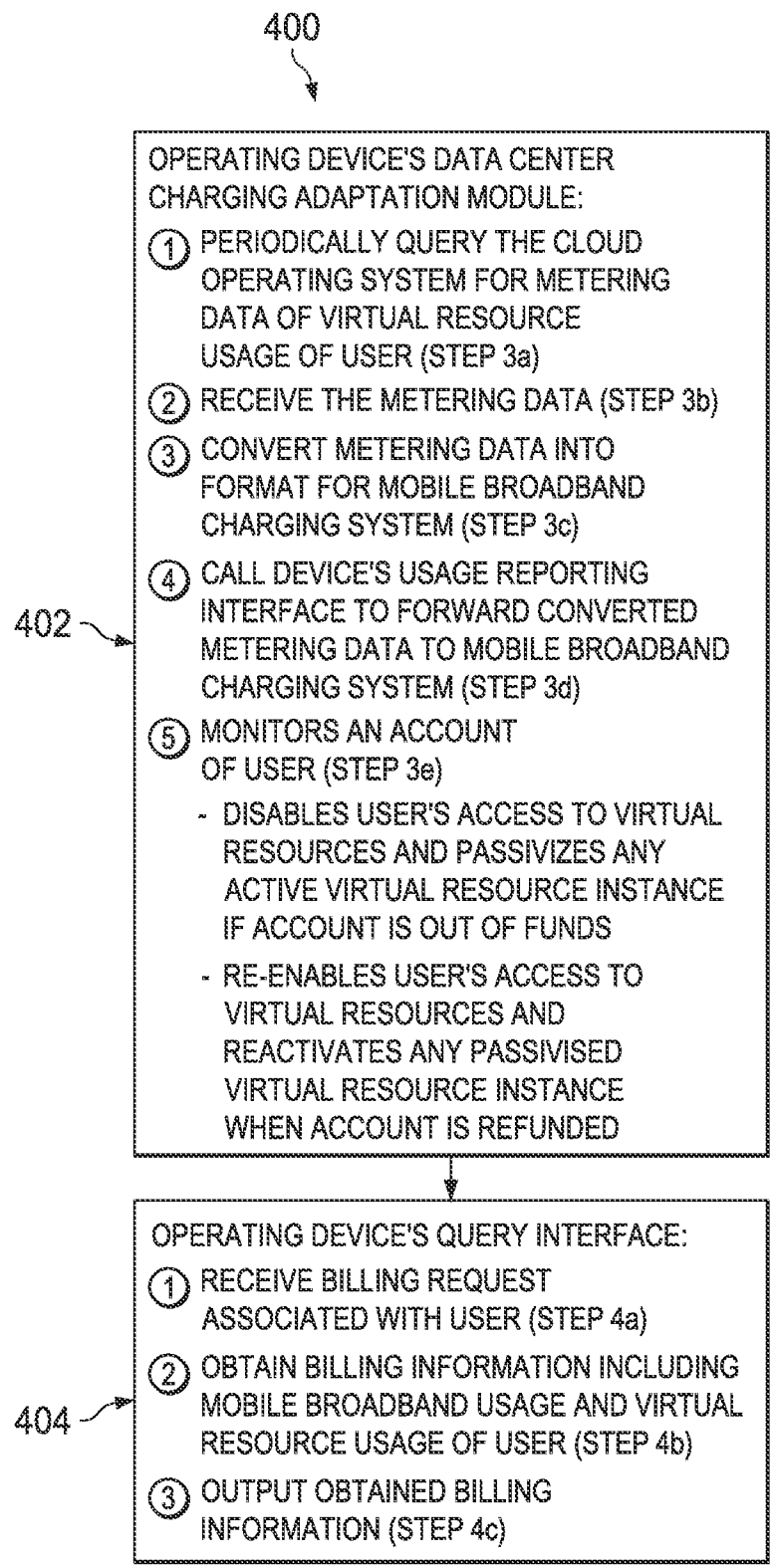
FIG. 4 is a flow chart of a method implemented in the system's specially configured device for billing the user for their consumption of mobile broadband services and virtualized cloud resources in accordance with an embodiment of the present invention.

Referring to FIG. 4, there is shown a flow chart of a method 400 implemented in the specially configured device 114 for billing the user 102 for their consumption of mobile broadband services 104 and virtualized cloud resources 106 in accordance with an embodiment of the present invention. At step 402, the specially configured device's data center charging adaptation module 132 is operated to: (1) periodically query the cloud operating system 112 for the stored metered data 123 associated with the monitored virtual resource usage 106 of the user 102 (step 3a), (2) receive the metered data 123 (step 3b), (3) convert the metered data 123 into a format supported by the mobile broadband charging system 110 (step 3c), (4) call the usage reporting interface 130 to forward the converted metered data 123 to the mobile broadband charging system 110 (step 3d) (note: the mobile broadband charging system 110 is configured to rate (in various ways) the converted metered data 123 and store charges 136 of the rated converted metered data in the charging database 118); and (5) monitor the account 135 of the user 102, disable access by the user 102 to the virtualized cloud resources 106 and passivize any active virtual resource instance if the account 135 is out of funds, and then re-enable access by the user 102 to the virtualized cloud resources 106' and reactive any passivised virtual resource instances if the account 135 is replenished with funds (this monitor operation is optional)(step 3e). At step 404, the specially configured device's query interface 134 is operated to: (1) receive the billing request 138 associated with the user 102 from the GUI 108 or the user 102 directly (step 4a); (2) obtain billing information 140 associated with the stored charges 116 of the rated mobile broadband usage 104 of the user 102 and the stored charges 136 associated with the rated converted metered data 123 of the virtual resource usage 106 of the user 102 from the mobile broadband charging system 110 (step 4b); and (3) output the obtained billing information 140 associated with the user 102 to the GUI 108 (operated by the mobile operator) or the user 102 (step 4c).

Referring to FIG. 5, there is a block diagram of an exemplary system 100 which has a commercially available OpenStack cloud operating system 112 where it's virtual resource metering system 516a, 516b and 516c are connected to a commercially available mobile charging system 110 by the aforementioned specially configured device 114 in order to bill the user 102 for their consumption of mobile broadband services 104 and virtualized cloud resources 106 in accordance with an embodiment of the present invention. The OpenStack cloud operating system 112 (see https://www.openstack.org) manages a large collection of servers 502a and 502b and storage devices 504a and 504b (disk clusters and flash storage devices). The servers 502a and 502b and storage devices 504a and 504b are connected together by a network 506. In addition, the OpenStack cloud operating system 112 has a data center identity management module 508 (configured to handle the authentication and authorization of the user 102), a data center virtualized compute module 510 (configured to manage virtualized computer resources 106a'), an object storage module 512 (configured to manage virtualized storage resources 106W), and a data center network virtualization module 514 (configured to manage virtualized network resources 106c'). The data center identity management module 508 (OpenStack's Keystone) is coupled to the data center virtualized compute module 510 (OpenStack's Nova), the object storage module 512 (OpenStack's Swift), and the data center network virtualization module 514 (OpenStack's Neutron). The data center virtualized compute module 510, the object storage module 512, and the data center network virtualization module 514 are all coupled to the networked servers 502a and 502b and storage devices 504a and 504b (virtualized resources 106a', 106b' and 106c'). Further, the OpenStack cloud operating system 112 has a data center management GUI 108 (commonly called a dashboard, in OpenStack this is Horizon) that is used to query the specially configured device 114 to obtain real-time billing information 140 for the user 102.

The OpenStack cloud operating system 112 also has a cloud resources metering system known as "Ceilometer" which comprises a first virtualized resource usage metering module 516a, a second virtualized resource usage metering module 516b, and a third virtualized resource usage metering module 516c. The first virtualized resource usage metering module 516a is configured to interact with the networked servers 502a and 502b and storage devices 504a and 504b and collect the virtual resource usage data comprising virtualized Infrastructure as a Service (IaaS) resources 106a which are consumed by the user 102 (steps 2a, 2b and 2c). Some exemplary IaaS resources 106a' (e.g., virtual CPU) that can be provided and monitored are illustrated in column 5 of TABLE #1 which is as follows:

Platform as a Service (PaaS) resources 106b' consumed by the user 102 (steps 2a, 2b and 2c). Some exemplary PaaS resources 106b' are as follows: (1) database storage and access; (2) hadoop big data analysis; (3) service catalog listing; and (4) service health monitoring.

The third virtualized resource usage metering module 516c is configured to interact with the networked servers 502a and 502b and storage devices 504a and 504b and collect virtual resource usage data comprising virtualized Software as a Service (SaaS) resources 106c' consumed by the user 102 (steps 2a, 2b and 2c). Some exemplary SaaS resources 106c' are as follows: (1) unified communication (enterprise VOIP) and other communication applications like virtual Enhanced Packet Core (mobile core for LTE); (2) TV over the Internet (e.g., Netflix); and (3) products such as salesforce.com like B2B marketing automation, HR management, and business data analysis. The virtualized resource usage metering modules 516a, 516a, 516c can also function as the aforementioned storage device(s) 124. It should be appreciated that the OpenStack cloud operating system 112 which performs the aforementioned steps 2a, 2b and 2c has other components and functionalities but for clarity those other components and functionalities have not been described herein.

The virtualized resource usage metering modules 516a, 516a, 516c are shown connected to the mobile broadband charging system 110 via the specially configured device's data center charging adaptation module 132 and the usage reporting interface 130 (e.g., usage reporting REST API 130). In operation, the data center charging adaptation module 132 periodically queries (step 3a) the virtualized resource usage metering modules 516a, 516a, 516c for virtual resource usage metering data 123 of the user 102, receives the metered data 123 (step 3b), and converts the received metered data 123 into format that can be handled by the mobile broadband charging system 110 (step 3c). The data center charging adaptation module 132 calls the usage

TABLE 1

IaaS resources 106a'
Usage Counter

| ID | Type | Value Type | Product Private | Description | Owner Type |
|---|---|---|---|---|---|
| 10001 | Common | Monetary Cost | | Openstack-Total VM Time Cost | Provider |
| 10020 | Common | Monetary Cost | | Openstack-VM Disk Read Cost | Provider |
| 10021 | Common | Monetary Cost | | Openstack-VM Disk Write Cost | Provider |
| 10022 | Common | Monetary Cost | | Openstack-VM Disk Storage Cost | Provider |
| 10030 | Common | Monetary Cost | | Openstack-VM Net Receive Cost | Provider |
| 10031 | Common | Monetary Cost | | Openstack-VM Net Transmit Cost | Provider |
| 10101 | Personal | Monetary Cost | | Openstack-Total VM Time Cost-Per Project Member | Provider |
| 10120 | Personal | Monetary Cost | | Openstack-VM Disk Read Cost-Per Project Member | Provider |
| 10121 | Personal | Monetary Cost | | Openstack-VM Disk Write Cost-Per Project Member | Provider |
| 10122 | Personal | Monetary Cost | | Openstack-VM Disk Storage Cost-Per Project Member | Provider |
| 10130 | Personal | Monetary Cost | | Openstack-VM Net Receive Cost-Per Project Member | Provider |
| 10131 | Personal | Monetary Cost | | Openstack-VM Net Transmit Cost-Per Project Member | Provider |
| 10201 | Personal | Non-Monetary unit | | Openstack-Monsoon Invite Promo | Consumer |
| 11001 | Personal | Monetary Cost | | Openstack-Total VM Time Cost-Per Individual User | Consumer |
| 11020 | Personal | Monetary Cost | | Openstack-VM Disk Read Cost-Per Individual User | Consumer |
| 11021 | Personal | Monetary Cost | | Openstack-VM Disk Write Cost-Per Individual User | Consumer |
| 11022 | Personal | Monetary Cost | | Openstack-VM Disk Storage Cost-Per Individual User | Consumer |
| 11030 | Personal | Monetary Cost | | Openstack-VM Net Receive Cost-Per Individual User | Consumer |
| 11031 | Personal | Monetary Cost | | Openstack-VM Net Transmit Cost-Per Individual User | Consumer |
| 20201 | Personal | Non-Monetary unit | | usage counter | Consumer |

The second virtualized resource usage metering module 516b is configured to interact with the networked servers 502a and 502b and storage devices 504a and 504b and collect virtual resource usage data comprising virtualized reporting REST API 130 to forward the converted metered data 123 to the mobile broadband charging system 110 (step 3d) (note: the data center charging adaptation module 132 can also perform the aforementioned step 3e). The mobile broadband charging system 110 rates the received metered data 123 and records the charges 136 in the charging database 118 for later billing (step 1d). In addition, the mobile broadband charging system 110 would perform the aforementioned steps 1a, 1b and 1c. The user 102 or mobile operator can obtain real time charging information 140 through the GUI 108. In operation, the GUI 108 sends the billing request 138 to the query REST API 132 to obtain billing information 140 for the user 102 indicating the mobile broadband service charges 116 and/or the virtual resource charges 136 (see aforementioned steps 4a, 4b and 4c).

The following is a detailed discussion about an exemplary usage reporting REST API 130, an exemplary query REST API 132, an exemplary billing request 138, and an exemplary billing information 140.

Charging System REST APIs

The mobile broadband charging system 110 would typically use the Diameter protocol (see RFC 3588) for registering charges and querying for real time reporting on charges incurred by the user 102. The cloud operating system 112 would typically operate on HTTP REST APIs and not protocol interfaces such as Diameter. For this reason, the specifically configured device 114 could utilize a REST API to provide an interface between the mobile broadband charging system 100 and the cloud operating system 112. In the discussion provided herein, the REST API comprises two components namely the usage reporting REST API 130 and the query REST API 132.

Usage Reporting REST API 130/Billing Request 138/Replied Billing Information 140

The following is an example of the usage reporting REST API 130, the billing request 138 which is formatted as a URL, and the replied billing information 140 which is either an HTML page, a JSON object, or text.

Command—CIPIP/REQUEST/EVENT

The billing request 138 can be in the form of an event request such as SCAPv2 in which case the billing request 138 can have request parameters as shown in TABLE #2 while the returned billing information 140 can have response parameters as shown in TABLE #3.

TABLE 2

Billing Request 138's parameters

| Parameter Name | Type | Default | Description |
| --- | --- | --- | --- |
| A-Number | M | | Charged subscriber |
| CC-Time | O | | Time to be rated |
| CC-Total-Octets | O | | Volume to be rated |
| CC-Service-Specific-Units | O | | Service specific units to be rated |
| Charging-Context-Id | O | | Charging Protocol |
| Requested-Action | O | 0 | |
| Service-Identifier | M | | |
| ret_format | O | html | |

In this example, it should be noted that one type of rated units must be selected and sent since it is not supported to rate more than one type of unit in the same message.

TABLE 3

Billing information 140's Response parameters

| Parameter Name | Type | Default | Description |
| --- | --- | --- | --- |
| Session-Id | O | | Session-Id |
| CC-Time | O | | Time that was rated |
| CC-Total-Octets | O | | Volume that was rated |

TABLE 3-continued

Billing information 140's Response parameters

| Parameter Name | Type | Default | Description |
| --- | --- | --- | --- |
| CC-Service-Specific-Units | O | | Service specific units that was rated |
| Cost | O | | Monetary cost |
| Result-Code | M | | Diameter Result-Code |

An exemplary billing request 138 for rating a SMS is as follows: REST CALL: http://192.168.56.3/trafficsim/diameterd.php?&trafficcase=CIPIP/REQUEST/EVENT&ret_format=json&A-Number=46733495040&B-Number=46733495041&Requested-Action=0&CC-Service-Specific-Units=1&Service-Identifier=4

An exemplary replied billing information 140 is as follows: JSON Return: {"Session-Id":"diameterd-1389706917-446049-5", "CC-Service-Specific-Units":1, "Cost":1, "Result-Code":2001}

The following is a discussion about the parameters in the exemplary billing request 138 and the exemplary replied billing information 140:

A-Number 520:

This parameter contains the subscriber identity of the subscriber/user 102 related to the operation. The A-Number should generally be presented in the international format starting with a country code.

Data Type: String
Element Format: Numeric
Example Value: 46733495040

CC-Time 522:

This parameter contains the number of used time units (seconds) that should be rated.

Data Type: Integer
Element Format: Numeric
Example Value: 240

CC-Total-Octets 524:

This parameter contains the number of used volume units (bytes) that should be rated.

Data Type: Integer
Element Format: Numeric
Example Value: 3145728

CC-Service-Specific-Units 526:

This parameter contains the number of used service specific units (SSU) that should be rated.

Data Type: Integer
Element Format: Numeric
Example Value: 1

Cost 528:

The cost associated with the operation, in the currency specified by the subscriber (user 102).

Data Type: Integer
Element Format: Numeric
Example Value: 12

Charging-Context-Id 530:

This parameter contains the charging context id, or protocol to be used.

Data Type: String
Element Value Range:

| Value | Description |
| --- | --- |
| SCAP_V.2.0@ericsson.com | SCAPv2 |

Service-Identifier 532:

This parameter contains the ID of the service that will be rated. The same service must also be configured in the mobile broadband charging system 110.
Data Type: integer
Element Format: Numeric
Example Value: 1
Requested-Action 534:

This parameter contains the action that should be performed in this operation.
Data Type: Integer
Element Value Range:

| Value | Description |
|---|---|
| 0 | DIRECT_DEBITING (Default) |
| 1 | REFUND_ACCOUNT |
| 2 | CHECK_BALANCE |
| 3 | PRICE_ENQUIRY (Not implemented in CS) |

Result-Code 536:

The Diameter Result-Code that indicates if the operation was successful. Below is a list of some common result-codes, but it should be appreciated that Diameter supports many more result-codes (see RFC 3588).
Data Type: Integer
Element-Value Range:

| Value | Description |
|---|---|
| 2001 | DIAMETER_SUCCESS |
| 4010 | DIAMETER_END_USER_SERVICE_DENIED |
| 4012 | DIAMETER_CREDIT_LIMIT_REACHED |
| 5002 | DIAMETER_UNKNOWN_SESSION_ID |
| 5030 | DIAMETER_USER_UNKNOWN |

Ret_Format 538:

This parameter tells the diameter daemon in what format the result should be returned.
Data Type: String
Element Value Range:

| Value | Description |
|---|---|
| Html | Complete HTML (Default) |
| Text | Plain text, not good for parsing |
| Json | JavaScript Object Notation [JSON] |

Session-ID 540:

The parameter indicates the session-ID.
Query REST API 134:

The Query REST API allows the GUI 108 to display a real time view of the changes. Here is another example query URL and return JSON:
Rest Call:
http://10.126.71.201/csadmin/request_handler.php?request=UsageCounters%2FGetThresholdsAndCounters&subscriberNumber=105000&associatedPartyID=1&action=Send&returnFormat=json
JSON Return: {"VM_UPTIME":50, "DISK_READ":42, "DISK_WRITE":105, "DISK_STORAGE":5280,"NETWORK_RECEIVED":960,"NETWORK_TRANSMITTED":1024}

In view of the foregoing, one will readily appreciate that the system 100, the device 114, and the various methods 300 and 400 which have been described herein enable an operator to bill the user 102 for their consumption of mobile broadband resources 104 and virtualized cloud resources 106. Further, one will readily appreciate that the system 100, the device 114 and the various methods 300 and 400 have many advantages some of which are as follows:

1. The device 114 can effectively interface a commercially available mobile broadband charging system 110 and a commercially available cloud operating system 112 in order to bill the user 102 for their consumption of mobile broadband resources 104 and virtualized cloud resources 106.

2. The system 100, the device 114 and the various methods 300 and 400 have an advantage in that they allow a mobile operator to do consolidated charging of mobile wireless service and cloud virtualized resource usage.

3. The system 100, the device 114 and the various methods 300 and 400 could also allow the mobile operator to host enterprise mobile applications in their data centers and thereby simplify charging fir the enterprise.

4. The system 100, the device 114 and the various methods 300 and 400 also allows the mobile operator to set up different kinds of charging plans tier different services. For instance, if a service such as a streaming media service is offered by a third party and hosted by the operator then the operator can charge the third party service provider for virtual infrastructure usage and the third party service provider can do their own billing to charge the user for the streaming media service. Alternatively, the operator can also charge the user for the streaming media service and then present the third party service provider a bill for the difference between the service charge and the virtualized resource charge.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A device configured for billing a user for their consumption of mobile broadband services which are monitored by a mobile broadband charging system and for their consumption of virtualized cloud resources which are monitored by a cloud operating system, the device comprising:
    a processor; and
    a memory that stores processor-executable instructions where the processor interfaces with the memory and executes the processor-executable instructions to enable following:
        a usage reporting interface;
        a data center charging adaptation module that (1) periodically queries the cloud operating system for stored metering data associated with a monitored virtual resource usage of the user, (2) receives the metering data, (3) converts the metering data into a format supported by the mobile broadband charging system, and (4) calls the usage reporting interface to forward the converted metering data to the mobile broadband charging system; and
        a query interface that (1) receives a billing request associated with the user, (2) obtains billing information associated with stored charges of a mobile broadband usage of the user and stored charges of the virtual resource usage of the user from the mobile broadband charging system, and (3) outputs the obtained billing information associated with the user, wherein the billing request is a Uniform Resource Locator, wherein the billing request comprises following parameters: A-number, a Charge Control (CC)-Time, CC-Total-Octets, CC-Service-Specific-Units, a Charging-Context-Identifier, a Requested-Action, a Service-Identifier, and a Return Format, wherein the outputted billing information is either a HyperText Markup Language (HTML) page, a JavaScript Object Notation (JSON) object, or text, and wherein the outputted billing information comprises following parameters: a Session-Identifier, a CC-Time, CC-Total-Octets, CC-Service-Specific-Units, Cost, and a Result-Code.

2. The device of claim 1, wherein data center charging adaptation module further monitors an account of the user, disables access by the user to the virtualized cloud resources and passivizes any active virtual resource instance when the account is out of funds, and re-enables access by the user to the virtualized cloud resources and reactivates any passivized virtual resource instances when the account is replenished with funds.

3. The device of claim 1, wherein the stored metering data associated with the monitored virtual resource usage of the user comprises at least one of
   virtualized Infrastructure as a Service (IaaS) resources;
   virtualized Platform as a Service (PaaS) resources; and
   virtualized Software as a Service (SaaS) resources.

4. The device of claim 1, wherein:
   the usage reporting interface is a usage reporting Representational State Transfer (REST) Application Programming Interface (API); and
   the query interface is a query REST API.

5. A method in a device for billing a user for their consumption of mobile broadband services which are monitored by a mobile broadband charging system and for their consumption of virtualized cloud resources which are monitored by a cloud operating system, wherein the device comprises a usage reporting interface, a data center charging adaptation module, and a query interface, and wherein the method comprising:
   operating the data center charging adaptation module to (1) periodically query the cloud operating system for stored metering data associated with a monitored virtual resource usage of the user, (2) receive the metering data, (3) convert the metering data into a format supported by the mobile broadband charging system, and (4) call the usage reporting interface to forward the converted metering data to the mobile broadband charging system; and
   operating the query interface to (1) receive a billing request associated with the user, (2) obtain billing information associated with stored charges of a mobile broadband usage of the user and stored charges of the virtual resource usage of the user from the mobile broadband charging system, and (3) output the obtained billing information associated with the user, wherein the billing request is a Uniform Resource Locator, wherein the billing request comprises following parameters: A-number, a Charge Control (CC)-Time, CC-Total-Octets, CC-Service-Specific-Units, a Charging-Context-Identifier a Requested-Action, a Service-Identifier and a Return Format wherein the outputted billing information is either a HyperText Markup Language (HTML) page, a JavaScript Object Notation (JSON) object, or text, and wherein the outputted billing information comprises following parameters: a Session-Identifier, a CC-Time, CC-Total-Octets, CC-Service-Specific-Units, Cost, and a Result-Code.

6. The method of claim 5, wherein further operating the data center charging adaptation module to monitor an account of the user, disable access by the user to the virtualized cloud resources and passivize any active virtual resource instance when the account is out of funds, and re-enable access by the user to the virtualized cloud resources and reactivate any passivized virtual resource instances when the account is replenished with funds.

7. The method of claim 5, wherein the stored metering data associated with the monitored virtual resource usage of the user comprises at least one of
   virtualized Infrastructure as a Service (IaaS) resources;
   virtualized Platform as a Service (PaaS) resources; and
   virtualized Software as a Service (SaaS) resources.

8. The method of claim 5, wherein:
   the usage reporting interface is a usage reporting Representational State Transfer (REST) Application Programming Interface (API); and
   the query interface is a query REST API.

9. A system configured for billing a user for their consumption of mobile broadband services and virtualized cloud resources, the system comprising:
   a graphical user interface;
   a mobile broadband charging system that (1) monitors mobile broadband usage of the user, (2) rates the monitored mobile broadband usage of the user, and (3) stores charges of the rated mobile broadband usage of the user;
   a cloud operating system that (1) monitors virtual resource usage of the user, (2) meters data associated with the monitored virtual resource usage of the user; and (3) stores the metered data associated with the monitored virtual resource usage of the user;
   a device comprising:
      a processor; and
      a memory that stores processor-executable instructions where the processor interfaces with the memory and executes the processor-executable instructions to enable following:
         a usage reporting interface;
         a data center charging adaptation module that (1) periodically queries the cloud operating system for the stored metered data associated with the monitored virtual resource usage of the user, (2) receives the metered data, (3) converts the metered data into a format supported by the mobile broadband charging system, and (4) calls the usage reporting interface to forward the converted metered data to the mobile broadband charging system, wherein the mobile broadband charging system rates the converted metered data and stores charges of the rated converted metered data of the monitored virtual resource usage of the user; and
         a query interface that (1) receives a billing request associated with the user, (2) obtains billing information associated with the stored charges of the rated mobile broadband usage of the user and the stored charges associated with the rated converted data of the virtual resource usage of the user from the mobile broadband charging system, and (3) outputs the obtained billing information associated with the user.

10. The system of claim 9, wherein data center charging adaptation module further monitors an account of the user, disables access by the user to the virtualized cloud resources and passivizes any active virtual resource instance when the account is out of funds, and re-enables access by the user to the virtualized cloud resources and reactivates any passivized virtual resource instances when the account is replenished with funds.

11. The system of claim 9, wherein the mobile broadband charging system further comprises a charging database configured to store the charges of the rated mobile broadband usage of the user and the charges of the rated converted data of the monitored virtual resource usage of the user.

12. The system of claim 9, wherein the cloud operating system further comprises:
a data center identity management module configured to handle an authentication and authorization of the user;
a data center virtualized compute module configured to manage virtualized computer resources;
an object storage module configured to manage virtualized storage resources;
a data center network virtualization module configured to manage virtualized network resources, wherein the data center identity management module is coupled to the data center virtualized compute module, the object storage module and the data center network virtualization module;
a network of servers and storage devices coupled to the data center virtualized compute module, the object storage module and the data center network virtualization module;
a first virtualized resource usage metering module configured to interact with the network of servers and storage devices and collect virtual resource usage data comprising virtualized Infrastructure as a Service (IaaS) resources consumed by the user;
a second virtualized resource usage metering module configured to configured to interact with the network of servers and storage devices and collect virtual resource usage data comprising virtualized Platform as a Service (PaaS) resources consumed by the user; and
a third virtualized resource usage metering module configured to configured to interact with the network of servers and storage devices and collect virtual resource usage data comprising virtualized Software as a Service (SaaS) resources consumed by the user.

13. The system of claim 9, wherein:
the mobile broadband charging system is configured to use a diameter protocol; and
the cloud operating system is configured to operate using Hypertext Transfer Protocol (HTTP) Representational State Transfer (REST) Application Programming Interfaces (APIs).

14. The system of claim 9, wherein:
the usage reporting interface is a usage reporting Representational State Transfer (REST) Application Programming Interface (API); and
the query interface is a query REST API.

15. The system of claim 9, wherein the billing request is a Uniform Resource Locator, wherein the billing request comprises following parameters: A-number, a Charge Control (CC)-Time, CC-Total-Octets, CC-Service-Specific-Units, a Charging-Context-Identifier, a Requested-Action, a Service-Identifier, and a Return Format, wherein the outputted billing information is either a HyperText Markup Language (HTML) page, a JavaScript Object Notation (JSON) object, or text, and wherein the outputted billing information comprises following parameters: a Session-Identifier, a CC-Time, CC-Total-Octets, CC-Service-Specific-Units Cost, and a Result-Code.

16. A method in a system for billing a user for their consumption of mobile broadband services and virtualized cloud resources, wherein the system comprises a graphical user interface, a mobile broadband charging system, a cloud operating system, and a device, the method comprising:
operating the mobile broadband charging system to (1) monitor mobile broadband usage of the user, (2) rate the monitored mobile broadband usage of the user, and (3) store charges of the rated mobile broadband usage of the user;
operating the cloud operating system to (1) monitor virtual resource usage of the user, (2) meter data associated with the monitored virtual resource usage of the user, and (3) store the metered data associated with the monitored virtual resource usage of the user;
operating the device which comprises a usage reporting interface, a data center charging adaptation module, and a query interface, wherein the operating the device comprises:
operating the data center charging adaptation module to (1) periodically query the cloud operating system for the stored metered data associated with the monitored virtual resource usage of the user, (2) receive the metered data, (3) convert the metered data into a format supported by the mobile broadband charging system, and (4) call the usage reporting interface to forward the converted metered data to the mobile broadband charging system, wherein the mobile broadband charging system further operates to rate the converted metered data and store charges of the rated converted metered data of the monitored virtual resource usage of the user; and
operating the query interface to (1) receive a billing request associated with the user, (2) obtain billing information associated with the stored charges of the rated mobile broadband usage of the user and the stored charges associated with the rated converted data of the virtual resource usage of the user from the mobile broadband charging system, and (3) output the obtained billing information associated with the user.

17. The method of claim 16, wherein further operating the data center charging adaptation module to monitor an account of the user, disable access by the user to the virtualized cloud resources and passivize any active virtual resource instance when the account is out of funds, and re-enable access by the user to the virtualized cloud resources and reactivate any passivized virtual resource instances when the account is replenished with funds.

18. The method of claim 16, wherein the mobile broadband charging system further comprises a charging database configured to store the charges of the rated mobile broadband usage of the user and the charges of the rated converted data of the monitored virtual resource usage of the user.

19. The method of claim 16, wherein the cloud operating system further comprises:
a data center identity management module configured to handle an authentication and authorization of the user;
a data center virtualized compute module configured to manage virtualized computer resources;
an object storage module configured to manage virtualized storage resources;
a data center network virtualization module configured to manage virtualized network resources, wherein the data center identity management module is coupled to the data center virtualized compute module, the object storage module and the data center network virtualization module;

a network of servers and storage devices coupled to the data center virtualized compute module, the object storage module and the data center network virtualization module;

a first virtualized resource usage metering module configured to interact with the network of servers and storage devices and collect virtual resource usage data comprising virtualized Infrastructure as a Service (IaaS) resources consumed by the user;

a second virtualized resource usage metering module configured to configured to interact with the network of servers and storage devices and collect virtual resource usage data comprising virtualized Platform as a Service (PaaS) resources consumed by the user; and a third virtualized resource usage metering module configured to configured to interact with the network of servers and storage devices and collect virtual resource usage data comprising virtualized Software as a Service (SaaS) resources consumed by the user.

20. The method of claim 16, wherein:

the mobile broadband charging system is configured to use a diameter protocol; and the cloud operating system is configured to operate using Hypertext Transfer Protocol (HTTP) Representational State Transfer (REST) Application Programming Interfaces (APIs).

21. The method of claim 16, wherein:

the usage reporting interface is a usage reporting Representational State Transfer (REST) Application Programming Interface (API); and the query interface is a query REST API.

22. The method of claim 16, wherein the billing request is a Uniform Resource Locator, wherein the billing request comprises following parameters: A-number, a Charge Control (CC)-Time, CC-Total-Octets, CC-Service-Specific-Units, a Charging-Context-Identifier, a Requested-Action, a Service-Identifier, and a Return Format, wherein the outputted billing information is either a HyperText Markup Language (HTML) page, a JavaScript Object Notation (JSON) object, or text, and wherein the outputted billing information comprises following parameters: a Session-Identifier, a CC-Time, CC-Total-Octets, CC-Service-Specific-Units, Cost, and a Result-Code.

* * * * *